Jan. 21, 1958  D. H. GREENWOOD  2,820,482
LINE BLIND GATE VALVE
Filed Dec. 3, 1954  2 Sheets-Sheet 1

INVENTOR:
Dolphice H. Greenwood
BY
H. O. Stevenson

INVENTOR:
Dolphice H. Greenwood
BY
H. J. Stevenson

United States Patent Office 2,820,482
Patented Jan. 21, 1958

2,820,482

LINE BLIND GATE VALVE

Dolphice H. Greenwood, Pasadena, Calif.

Application December 3, 1954, Serial No. 472,973

3 Claims. (Cl. 138—94.3)

This invention relates generally to line-blind valves for shutting off the flow of fluid through a pipe line, and more particularly to a valve which I prefer to call a line-blind gate valve having a wedge-type valving element insertable into a valve body between spaced, oppositely inclined valving faces thereof.

Line blind valves commonly in use include a valve body having a flow passage therethrough, the body having an opening in its upper side through which a valving element or "blind" is insertable into the body between spaced valving faces therein, means being provided for clamping the element between the faces in an effort to provide a leak-proof engagement. This last-named means usually involves the use of screws which are operative to draw the two longitudinally-spaced members of the valve body toward each other to grip the blind therebetween. In another form of line blind valve disclosed in my pending application, Serial No. 272,805, filed February 21, 1952, now Patent No. 2,709,455, May 31, 1955, titled Line Blind Valve, the blind is adapted to be clamped between relatively axially movable tubular elements within a one-piece valve body.

In either case, it is usual practice to employ a "spectacle" type blind which has two circular plate portions joined by a web. One of the plates is provided with a circular hole which, when this end of the spectacle is inserted into the valve body and clamped in place, aligns with the flow passage so that uninterrupted flow of fluid through the valve is effected. On the other hand, the second blind plate is devoid of such an orifice so that when this end of the spectacle is inserted and clamped within the valve body it serves to stop the flow of fluid through the line in which the valve is installed.

It is a well known fact that reversing of the spectacle to stop the flow of fluid, or to establish flow, as the case may be, is a time consuming and laborious task. In the case of a large valve, for example one used in a 12 inch line, the spectacle may weigh approximately one-hundred pounds and the services of two workmen are required to withdraw the blind from the valve, reverse the spectacle and insert the other blind thereof into the valve. Means have been provided by which the spectacle, after having been withdrawn from the valve body, may be rotated through 180 degrees exteriorly of the valve body but in this case, as in other line blind valves, it is still necessary to lift the spectacle to an extent which permits such rotation of the spectacle. As will be apparent, the need for two workmen to handle the spectacle-type blind results in increased maintenance costs and this is an important consideration in oil fields and refineries where large numbers of the line blind valves are employed.

With a view toward obviating this difficulty, the present invention has for its primary object the provision of a line gate valve employing two separate wedge-type blinds or gates, either of which is insertable into the valve body independently of the other. By this provision, each blind or gate which weighs one-half of that of a spectacle blind, may be conveniently manipulated by a single workman so as to minimize the operating and maintenance costs of the valve.

In order to further facilitate operation of the valve, the present invention contemplates means by which each blind or gate may be quickly and easily inserted into or removed from the valve body with very little effort on the part of the workman and without requiring direct lifting of the blind or gate by the workman. According to another feature and object of the invention, this highly desirable result is attained by providing a yoke carried by and located above the valve body, and a vertical operating screw or stem vertically movable in the yoke and releasably supporting the wedge-type blind or gate, operation of the stem serving to lower the wedge into the valve body or raise the same, depending upon the direction of rotation of a nut on the yoke engageable with the screw-threaded stem, such rotation of the nut being accomplished by means of a relatively large handwheel connected to the nut.

Another object of the invention is to provide a valve, of the character referred to, having means by which the wedge-type blind or gate elements may be readily and selectively connected to and disconnected from the lower end of the vertically movable operating screw or stem without requiring manually lifting the elements. This object is attained by providing a pair of holders on the yoke, said holders being located laterally outward of the stem at opposite sides thereof and each holder having a horizontal tongue and a groove extending normal to the axis of the stem, by providing a corresponding tongue and a groove at the upper end of each blind, and by providing a corresponding tongue and groove at the lower end of the vertically movable stem. By this specific structure, the wedges or blinds may be slidable laterally onto the holders with the tongue of each wedge slidably received in the groove of a holder and with the tongue of each holder disposed in the groove of the wedge. In a like manner, either wedge may be transferred laterally from a holder to the stem so as to be suspended therefrom by simply sliding the wedge sidewise into axial alignment with the stem with the tongue of the wedge sliding into the groove of the stem and with the groove of the wedge receiving the tongue of the stem. Thus, by the present improved structure, either wedge may be detachably connected to the stem for insertion into the valve body by the simple act of transferring the wedge from the holder into engagement with the stem with a simple sliding motion which can be easily accomplished by the workman. Conversely, when it is desired to substitute one wedge for the other, the wedge carried by the stem may be transferred from the stem into a holder by simply aligning the tongue of the wedge with the groove of the holder and sliding the wedge laterally away from the stem, after which the other wedge element may be slid from its holder and connected to the stem by engaging its tongue in the groove at the lower end of the elevated stem.

Another object of the invention is to provide a valve of the type specified in which one of the wedge elements is always exposed to view above the valve body so that it may be determined at a glance whether the orifice type or blind type wedge is in place in the valve body and consequently whether the valve is opened or closed to flow of fluid in the line. A related object is to provide a valve-element manipulating means which may be embodied in an orifice fitting for holding and transferring selectively to a spindle or stem orifice plates having orifices of different size for regulating the flow of fluid through the line.

A further object of the invention is to provide a line blind valve of alternative form in which separate wedge elements are used and mountable at the opposite ends of a screw-type operating stem which is screwed down through a bar located above the valve body. According to this alternative structure, the bar has hook-shaped ends which are engageable with upstanding studs carried by the valve body at opposite sides of the stem. By this provision, the stem, bar and lower wedge may be removed from the body by simply rotating the bar to free its hook ends from the studs and then lifting the entire unit. The other wedge may then be substituted for the one withdrawn from the valve body and the assembly then lowered to insert the substitute wedge into the valve body, the stem then being rotated to force the wedge downwardly. The previously withdrawn wedge is then placed upon the upper end of the stem where it is held for future use, this wedge being latched in place on the stem.

Further objects of the invention will be apparent from the following detail description and from the drawings which are intended for the purpose of illustration only, and in which:

Fig. 1 is a longitudinal sectional view through the line blind gate valve showing one of the wedge elements in place in the valve body;

Fig. 2 is a view of the upper end of the valve structure showing the first wedge element withdrawn from the valve body and transferred to one of the holders and showing the second wedge element transferred from the other holder into engagement with the operating spindle to be lowered thereby into the valve body;

Fig. 3 is a view similar to Fig. 1, illustrating said second wedge element as lowered into the valve body;

Fig. 4 is a sectional plan view through the upper portion of the structure, taken on line 4—4 of Fig. 3;

Figure 5:
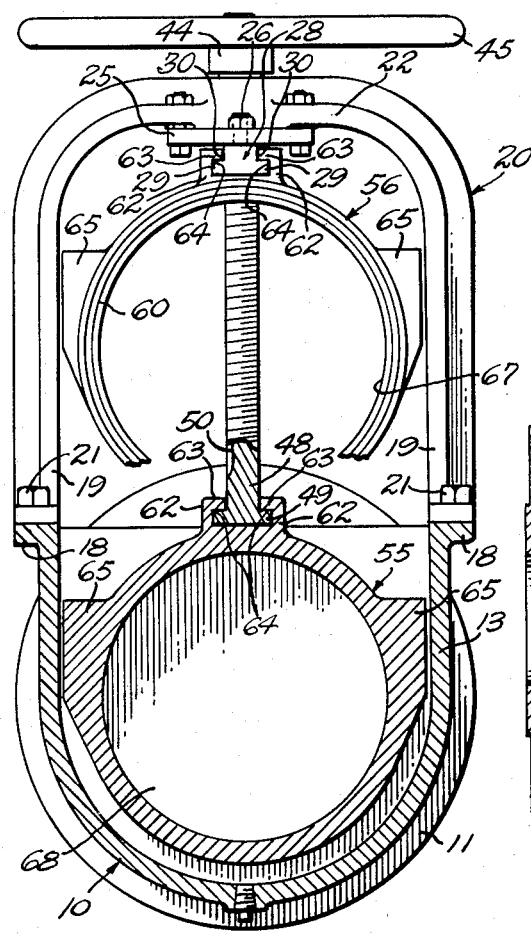
Fig. 5 is a cross-sectional view, taken on line 5—5 of Fig. 1.

Referring first to Figs. 1 to 5 in detail, the preferred valve shown therein includes a cast valve body 10 of tubular form having flanges 11 at its ends by which it may be installed between the flanged ends of adjoining sections of a pipe line, the body having an axial flow passage 12. At its central portion, the valve body 10 has an outwardly flared well 13 (Fig. 5) provided with a tapered slot 14, the sides 15 and 16 of which form valving faces which converge toward the bottom of the valve body.

The sides of the flared portion 13 are provided with lateral flanges 18 providing ledges to which the lower ends of the legs 19 of an inverted U-shaped support or yoke 20 is secured by means of bolts 21, the yoke being of T-shape cross section to provide great strength. The upper cross-bar portion 22 of the yoke 20 extends transversely across the valve body 10 in vertical alignment with the slot 14.

Bolted to the under side of the cross-bar portion 22 of the yoke 20 is a support plate 25. Secured against the under side of the plate 25 by bolts 26 are holder elements 27 and 28 which, as shown in Fig. 5, are inverted T-shaped blocks each having lower, longitudinally extending tongues 29 and defining between the tongues and the plate 25 longitudinal grooves 30. As shown in Fig. 1, the holder elements 27 and 28 are located at opposite sides of the vertical centerline of the valve slot 14. The inner spaced ends of the elements 27 and 28 define, with the lower surface of the plate 25, a recess or slot 31. Welded, or otherwise secured against the outer ends of the holder elements 27 and 28 are stop strips 32.

Suitably secured against the upper surface of the support plate 25 is a retainer element 35 having a bore 36 and counterbore 37 which are axially aligned with a clearance hole 38 in the plate 25, the axis of the hole 38 and retainer element being located above the exact center of the valve slot 14 and the centerline of the flow passage 12, as shown in Figs. 1 and 5. An internally threaded cylindrical nut element or sleeve 40 has a peripheral flange 41 rotatable in the counterbore 37 and an intermediate shank portion 42 rotatable in the bore 36. An upper reduced end 43 of the nut element projects above the retainer element 35 and surrounding this portion and secured thereto is the hub 44 of a large handwheel 45.

Threaded upwardly through the nut element 40 is the upper end of a threaded operating spindle or stem 48. The lower end of the stem 48 is provided with a square flange 49 providing, in effect horizontal tongues. The stem 48 also has long keyways 50 in which keys 51 carried by the support plate 25 engage (Fig. 4).

Adapted to be lowered into the slot 14 of the valve body 10 are line blinds or gates 55 and 56 which, for convenience will be referred to as wedges. As shown in Fig. 5, each wedge 55 and 56 is, in effect, a circular plate and it will be noted from Figs. 1 to 3 that the wedges have sloping annular sides 57 and 58 formed on the opposite end faces of an annular ring and which conform to the inclined sides or valving faces 15 and 16 so that when each wedge is forced downwardly into the slot 14 it fits snugly therein. A closure diaphragm 68 preferably cast integral with the annular ring of wedge 55 cooperates with the latter in providing the movable valve element of the valve construction. The faces 57 and 58 are provided with annular grooves, of the type disclosed in my pending application referred to above, in which O-rings 60 are disposed and compressible to provide an effective sealing means between the engaging valve faces 57, 58 of the wedges and the valving faces 15, 16 of the valve body.

Each wedge 55 and 56 is provided at its upper wider end with upstanding lugs 62 of L shape providing laterally spaced tongues 63 and grooves 64 therebeneath. Each wedge also has fins 65 at its sides which slide downwardly into grooves in the sides of the well 13 to guide the wedge into place in the tapered slot 14. The wedge 56 is of annular form, having a large orifice 67 which is adapted to register with the flow passage 12 when this wedge is inserted in the valve body 10 as shown in Fig. 3. The other wedge 55 is, in effect, a solid plate having a transverse web 68.

As shown in Figs. 1 to 3, the holder elements 27 and 28 are located in alignment at opposite sides of the axis of the operating screw 48, the space 31 therebetween being slightly wider than the corresponding width of the lugs 62 of the wedges 55 and 56. The holder elements 27 and 28 are adapted to support the wedges 55 and 56 in suspended position above the valve body. To so suspend the wedges in this inoperative position, each wedge is slid onto a holder 27 or 28 with the tongues 63 of the wedge sliding into the grooves 30 and with the tongues 29 of the holder entering the grooves 64 of the wedge. By this interengagement of the tongues 63 and 29, the wedge is supported from the holder element in suspended position. During assembly of the valve, the wedges 55 and 56 are slid onto the holder elements 27 and 28 and the latter are then secured in place against the under side of the support plate 25.

With the wedges 55 and 56 thus suspended from the respective holder elements 27 and 28 and with the valve body installed in a pipe line, the line blind gate valve is ready for use. Assuming that it is desired to maintain full fluid flow through the line, the wedge 56 having the orifice 67 is lowered into the valve body as shown in Fig. 3. To accomplish this result, the handwheel 45 is rotated and by reason of the interengaging threads on the rotary, but axially stationary, nut element 40 and on the spindle or stem 48, the latter is drawn upwardly. Eventually, the tongues 49 of the stem 48 will align horizontally with the tongues 29 of the holder elements 27 and 28. The tongues 29 and 49 thus provide substantially continuous guides upon which the tongues 63 of the wedge 56 rest and along which the wedge may be slid laterally from the position shown by full lines in Fig. 1 and in broken lines in Fig. 2 to the position illustrated by full lines in Fig. 2, whereupon the wedge is supported by and suspended from the lower end of the operating stem 48 due to the fact that the tongues 63 of the wedge now rest directly upon the tongues 49 of the stem.

With the wedge 56 thus transferred from its inoperative position on the holder element 28 to its operative position on the stem 48, the handwheel 45 is now rotated in the opposite direction so as to cause lowering of the stem and the wedge 46 carried thereby. Thus, the wedge 56 is forced downwardly into the tapered slot 14 of the valve body where the valving faces 57 and 58 of the wedge firmly engage the corresponding valving faces 15 and 16 of the valve body. At the same time, the O-rings 60 are compressed between the engaging valving faces to provide a fluid-tight seal.

When it is desired to shut off the flow of fluid through the line, the orifice wedge 56 is elevated from the position shown in Fig. 3 to that shown by full lines in Fig. 2 by simply rotating the handwheel 45. When the lower end of the stem 48 arrives at a position in which its tongues 49 align horizontally with the tongues 29 of the holder elements 27 and 28, the wedge 56 is transferred from the stem 48 to the holder element 28 by simply sliding it laterally. With the wedge 56 restored to its inoperative position shown in full lines in Fig. 1 and in broken lines in Fig. 2, the blind wedge 55 is transferred from the holder element 27 onto the stem 48 with the tongues 63 of the wedge sliding from the tongues 29 onto the tongues 49. With the wedge 55 thus axially aligned with the stem 48, the handwheel 45 is rotated in a direction to force the wedge 55 downwardly and firmly into the slot 14 of the valve body with its O-rings 60 operating to seal between the valving faces 57, 15 and 58, 16. The wedge 55, when thus installed in the valve body 10, serves as a blind to prevent flow of fluid through the line.

To re-establish fluid flow, the wedge 55 is elevated and transferred laterally from the stem 48 onto the holder element 27 and the other wedge 56 is transferred laterally from the holder element 29 onto the stem for lowering into the valve body. The stops 32 on the holder elements serve to limit outward sliding movement of the wedges so as to prevent a condition where the wedges might be slid off from the holder elements.

It will be observed from the foregoing that the present invention provides a valve which I prefer to term a line blind gate valve since the wedge type blinds resemble ordinary gates employed in gate valves. In accordance with the invention, means are provided for facilitating insertion and removal of the wedges into and from the valve body and it is to be particularly noted that such operation is accomplished without requiring direct manual lifting of the wedges by the workman. In the improved valve, the wedges are separate, independently operated elements which are lifted and lowered by mechanical means, namely a screw stem which is easily rotated by a large handwheel provided for this purpose. Thus, physical effort on the part of the workman is effectively minimized and the operation of converting the valve from one permitting full fluid flow to one operative to stop such flow is greatly simplified and carried out in a systematic manner. This constitutes an important improvement over conventional line blind valves wherein a double blind of the spectacle type is employed and must be lifted manually from the valve body, reversed and reinserted into the body, it being noted that such spectacles used in, for example, a twelve inch valve, may weigh approximately one-hundred pounds so that the services of two men are necessary to effect the change-over. It will further be observed that the wedges are easily shifted laterally onto and from the operating stem with little physical effort on the part of the single workman. Since there is always located above the valve body, one of the wedges 55 or 56, the condition of the valve, that is, whether it is open or closed to fluid flow, may be ascertained at all times by simply observing whether the blind wedge 55 or the flow wedge 56 is in use.

Figure 6:
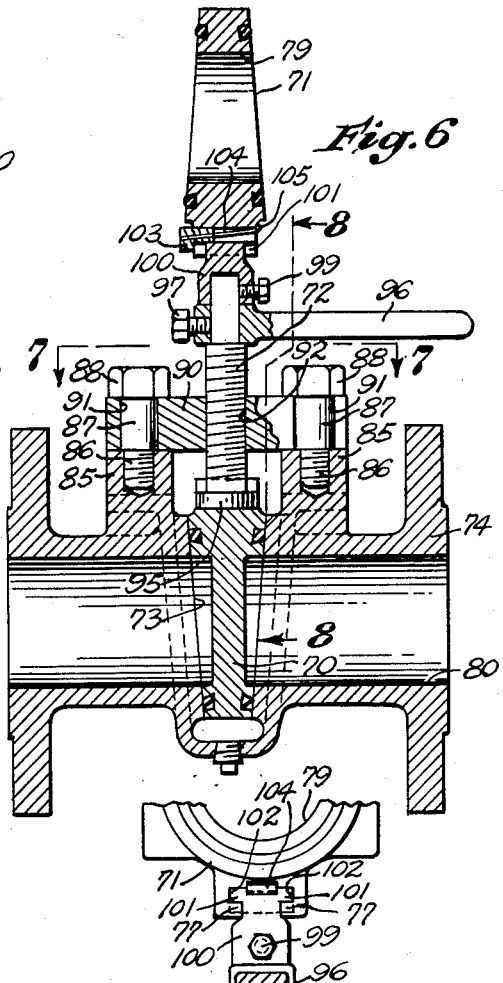
Fig. 6 is a longitudinal sectional view through a valve of alterantive construction.
Figure 7:
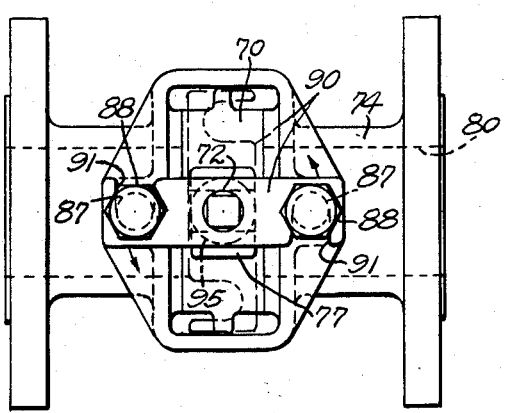
Fig. 7 is a sectional plan view, taken on line 7—7 of Fig. 6.
Figure 8:
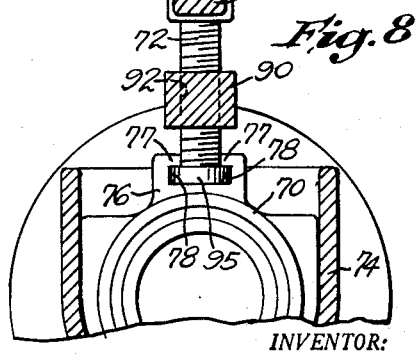
Fig. 8 is a cross-sectional view, taken on line 8—8 of Fig. 6.

Referring now to Figs. 6, 7 and 8, the present invention also contemplates a valve structure in which separate wedge elements 70 and 71 are attachable to and detachable from an operating stem 72 to be selectively forced downwardly into the tapered valve slot 73 of the valve body 74 or lifted therefrom. In this modified structure, the wedges 70 and 71 are similar to those previously described, each wedge having an upstanding lug 76 formed with an inverted T-slot providing tongues 77 and grooves 78. As shown, the wedge 70 is of the closed plate or blind type while the wedge 71 has a flow orifice 79.

The valve body 74 has a flow passage 80 and is provided with upstanding bosses 85 having tapped holes into which are screwed the lower reduced ends of studs 86 having shanks 87 and heads 88. A support or bearing bar 90 has slots 91 at its opposite ends, these slots extending inwardly from opposite sides of the bar. Located at the center of the bar 90 is a threaded hole 92 through which the operating stem 72 is threaded.

The lower end of the operating screw or stem 72 is provided with a cylindrical flange or bead 95 of a diameter and thickness to be received in the grooves 78 of a wedge. The upper end of the stem 72 is made square to receive the hub of an operating lever or handle 96 which is held axially in place by a set-screw 97. Also secured to this square end of the stem 72 by a set-screw 99 is a carrier or holder 100 which, as shown in Fig. 8, has a T-shaped head at its upper end providing lateral tongues 101 and grooves 102. The T-shaped head provides a support for either of the wedges 70 or 71 to hold the same in its inoperative, elevated position.

As will be apparent from Figs. 6 and 8, the wedge is applied to the holder 100 by simply inverting the wedge and sliding it laterally with its tongues 77 entering the grooves 102 of the holder and with the tongues of the holder entering the grooves 102 of the wedge. The upper end of the holder 100 has a stop strip 103 against which the wedge is slid. The wedge is held in place thereagainst by means of a spring latch 104 carried by the stop 103 and extending through a slot in the upper end of the holder, said latch having a hook 105 at its free end adapted to snap over the side of the lug 76 of the wedge to releasably retain the latter in its inverted position on the holder 100. The bead 95 at the lower end of the wedge 70 or 71 is receivable in the grooves 78 of the wedge to connect the wedge to the stem 72, it being noted that in this case, the bead is rotatable in the grooves 78.

Assuming that a wedge 70 is connected to the lower end of the stem 72 and has been forced downwardly into the valve body 74 as shown in Figs. 6 and 8, and that the other wedge 71 is supported at the upper end of the stem 72, to convert the valve from a blind type to one of a free flow type, the upper wedge 71 may first be removed from the stem 72. The handle 96 is then turned to rotate the stem 72 in a direction to elevate the wedge 70 slightly from the valve seat 73. With the wedge thus unseated, the bearing bar 90 is rotated on the stem in the manner illustrated by broken lines in Fig. 7. After the slotted ends 91 of the bar have thus been released from the studs 87, the entire assembly 90, 72, 70 is lifted from the valve body 74. The stem 72 is next disconnected from the wedge 70 and the other wedge 71 is connected to the lower end 95 of the stem, after which the wedge 71 is lowered into the seat 73 and the bar 90 is re-connected to the studs 87 as shown in Figs. 6 and 7. By screwing the stem 72 downwardly, by means of the handle lever 96, the wedge 71 is seated within the valve body 74. The previously withdrawn wedge 70 then may be connected to the holder 100 at the upper end of the stem 72 by sliding it laterally onto the flanges 101 thereof, the spring latch 105 snapping over the side of the lug 76 to retain the wedge in place. To substitute the wedge 70 for the wedge 71 in the valve body, the procedure explained above is reversed.

In accordance with the provisions of the patent statutes, I have described the principle of the invention, together with two preferred valve structures thereof which I now consider to represent the best embodiments of the invention. I wish to have it understood, however, that various modifications might be made in the structure without departing from the spirit or scope of the invention, as defined in the appended claims.

I claim as my invention:

1. A line blind valve for installation in a fluid line, said valve having a tubular body open at its opposite ends, said body having a V-shaped notch opening through one side thereof and extending into a recess opening through the inner surface of said body opposite said side opening, the opposed edges of said opening and of said recess lying in slightly divergent planes and forming seating surfaces for a closure member, a U-shaped yoke overlying said side opening and supporting in the bight portion thereof threaded stem means movable toward and away from said opening, means carried by said yoke for supporting a plurality of closures, said closures being selectively attachable to said threaded stem means and adapted to seat against said seating surfaces upon being firmly pressed into said V-shaped notch, and cooperating tongue and groove means on said body and closures for holding said closure centered between said seating surfaces as the closure is being moved into and out of said V-shaped notch.

2. A valve as defined in claim 1 wherein said plurality of closures include a ring closure member having end surfaces lying in slightly divergent planes, a second one of said closures being of similar shape to said ring closure member and having a diaphragm carried by its ring-shaped periphery.

3. A line blind valve comprising an open-ended tubular body having a side opening providing free access to a pair of facing valve seats lying in diverging planes, a U-shaped yoke having its ends supported by said body to either end of said side opening and having a threaded valve stem carried in the bight portion thereof, a plurality of closure members selectively connectable with said stem for movement thereby into sealing engagement with said valve seats, said closure members having a T-slot loosely engageable over a radial flange on the end of said stem, said closure members having guide flanges projecting from their opposite sides and lying parallel to one another and to said valve stem, cooperating guide recesses in said valve body having a loose fit with said flanges and cooperating therewith in guiding a closure member into seating position between said valve seats without danger of damage to the sealing surfaces of said valve faces and of said closure members, and means on the opposite sides of said yoke adjacent said valve stem for supporting one closure member in a fully exposed position while another closure member is mounted on said stem for use in closing the side opening in said valve body.

References Cited in the file of this patent
UNITED STATES PATENTS

| | | |
|---|---|---|
| 1,485,264 | Heald | Feb. 26, 1924 |
| 1,540,209 | Frazier | June 2, 1925 |
| 1,933,182 | Pagon et al. | Oct. 31, 1933 |
| 2,031,151 | Eulberg | Feb. 18, 1936 |
| 2,558,247 | Homer | June 26, 1951 |